(12) United States Patent
Feder et al.

(10) Patent No.: US 8,359,137 B2
(45) Date of Patent: Jan. 22, 2013

(54) METHOD AND DEVICE FOR OPERATING A MOTOR VEHICLE

(75) Inventors: Johannes Feder, Neutraubling (DE); Björn Kattentidt, Neutraubling (DE); Stefan Maier, Regensburg (DE); Martin Prenninger, Regensburg (DE)

(73) Assignee: Continental Automotive GmbH, Hannover (DE)

( * ) Notice: Subject to any disclaimer, the term of this patent is extended or adjusted under 35 U.S.C. 154(b) by 554 days.

(21) Appl. No.: 12/522,459

(22) PCT Filed: Jan. 16, 2008

(86) PCT No.: PCT/EP2008/050428
§ 371 (c)(1),
(2), (4) Date: Dec. 14, 2009

(87) PCT Pub. No.: WO2008/087152
PCT Pub. Date: Jul. 24, 2008

(65) Prior Publication Data
US 2010/0100273 A1 Apr. 22, 2010

(30) Foreign Application Priority Data
Jan. 18, 2007 (DE) .......................... 10 2007 002 748

(51) Int. Cl.
*A01B 69/00* (2006.01)

(52) U.S. Cl. ...................................................... 701/43

(58) Field of Classification Search ............ 701/43, 701/44, 62, 31.6, 31.7, 31.9
See application file for complete search history.

(56) References Cited

U.S. PATENT DOCUMENTS

| 6,015,193 | A | * | 1/2000 | Vogel et al. | 303/147 |
|---|---|---|---|---|---|
| 6,811,665 | B2 | | 11/2004 | Blum et al. | 204/486 |
| 7,370,723 | B2 | | 5/2008 | Bitter et al. | 180/290 |
| 7,427,913 | B2 | | 9/2008 | Maron | 340/438 |
| 2004/0243287 | A1 | | 12/2004 | Yanaka et al. | 701/29 |
| 2005/0007246 | A1 | * | 1/2005 | Yen et al. | 340/471 |
| 2010/0256854 | A1 | * | 10/2010 | Feder et al. | 701/29 |

FOREIGN PATENT DOCUMENTS

| DE | 4302925 | | 8/1994 |
|---|---|---|---|
| DE | 19733312 | | 2/1999 |
| DE | 19832950 | | 8/1999 |
| DE | 20101014 | | 6/2002 |
| DE | 10302776 | | 8/2004 |
| DE | 102004026594 | | 3/2005 |
| EP | 1447583 | | 8/2004 |
| EP | 1612184 | | 1/2006 |
| JP | 2005053373 A | * | 3/2005 |
| WO | 2004037614 | | 5/2004 |
| WO | WO 2008037769 A1 | * | 4/2008 |

OTHER PUBLICATIONS

German Office Action for Application No. 10 2007 002 748.8 (3 pages), Apr. 24, 2009.
International Search Report and Written Opinion for Application No. PCT/EP2008/050428 (12 pages), Apr. 11, 2008.

* cited by examiner

*Primary Examiner* — Faye M. Fleming
(74) *Attorney, Agent, or Firm* — King & Spalding L.L.P.

(57) ABSTRACT

For the operation of a motor vehicle (2), when a critical (CRIT) operation state (STATE) of the motor vehicle (2) and/or a drive system (4) of the motor vehicle (2) is detected in which an operation error (ERROR) can occur, a driver of the motor vehicle (2) is signaled (SIG) that there is a critical (CRIT) operation state (STATE). When the operation error (ERROR) occurs, the system is switched into a limited operation (LIMIT) of the drive system (4).

12 Claims, 2 Drawing Sheets

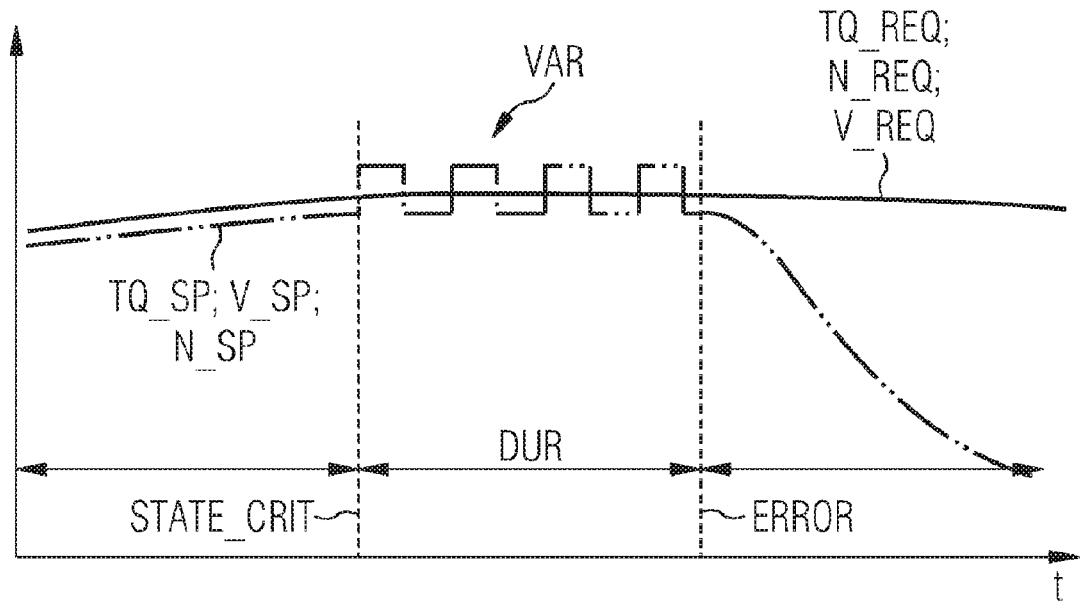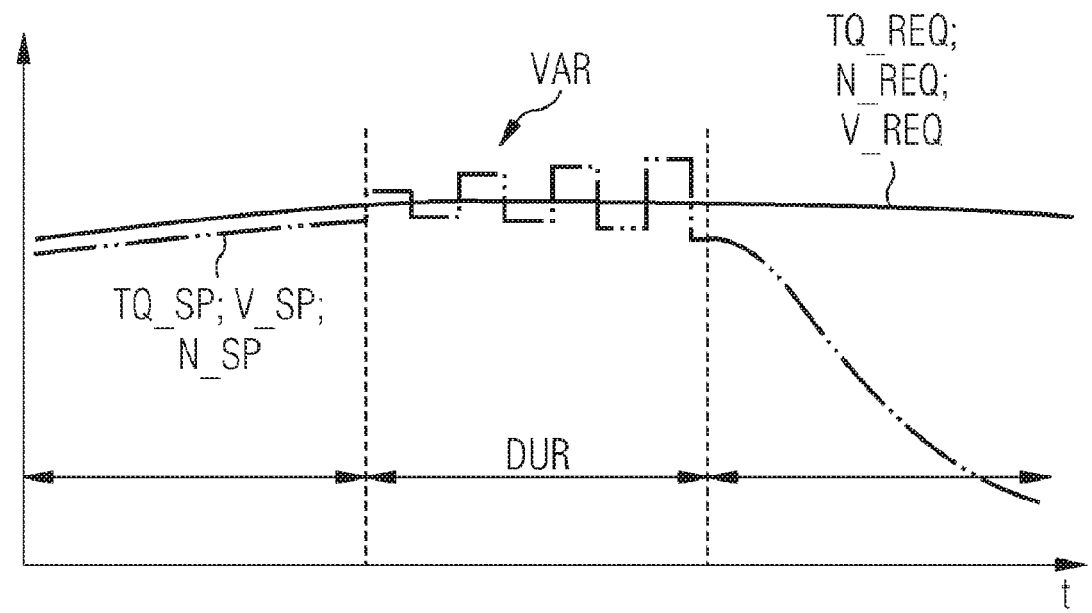

METHOD AND DEVICE FOR OPERATING A MOTOR VEHICLE

CROSS-REFERENCE TO RELATED APPLICATIONS

This application is a U.S. National Stage Application of International Application No. PCT/EP2008/050428 filed Jan. 16, 2008, which designates the United States of America, and claims priority to German Application No. 10 2007 002 748.8 filed Jan. 18, 2007, the contents of which are hereby incorporated by reference in their entirety.

TECHNICAL FIELD

The present invention relates to a method and a device for operating a motor vehicle.

BACKGROUND

If an operating error of the motor vehicle and/or of a drive system of the motor vehicle occurs, there is a switchover to a limited operation of the drive system.

Drive systems of modern motor vehicles are regularly protected from damage by safety measures. The safety measures may be for example a limitation of a torque generated by the drive system, of a rotational speed of the drive system and/or of a velocity of the motor vehicle. These safety measures are taken as soon as a management system of the drive system detects an operating error of the drive system. The drive system may comprise for example an internal combustion engine and/or an electric motor.

SUMMARY

According to various embodiments, a method and a device for operating a motor vehicle can be provided that enable safe driving with the motor vehicle.

According to an embodiment, in a method of operating a motor vehicle, upon detection of a critical operating state of the motor vehicle and/or of a drive system of the motor vehicle that may lead to an operating error the existence of the critical operating state is signaled to a driver of the motor vehicle and, if the operating error occurs, there is a switchover to a limited operation of the drive system. According to another embodiment, in a method of operating a motor vehicle, whereby, if an operating error of the motor vehicle and/or of a drive system of the motor vehicle occurs, there is a switchover to a limited operation of the drive system and whereby, given active and/or non-active limitation of the drive system, it is signaled to a driver of the motor vehicle that the drive system is being operated in limited operation.

According to a further embodiment, a signal effect for signaling limited operation may be intensified from detection of the critical operating state up to the switchover to limited operation and/or from the switchover to limited operation up to overshooting or undershooting of the limitation. According to a further embodiment, the detection of the critical operating state and/or the switchover to limited operation may be signaled by a reaction of the drive system and/or by a driver information system. According to a further embodiment, the reaction of the drive system may comprise a variation of an actual position of an actuator about a defined actual position of the actuator. According to a further embodiment, the position of the actuator may have an effect upon a torque generated by the drive system and/or upon a rotational speed of the drive system and/or upon a velocity of the motor vehicle. According to a further embodiment, given the existence of the critical operating state the manner in which the occurrence of the operating error may be prevented can be signaled to the driver and/or whereby given the switchover to limited operation the manner in which overshooting or undershooting of the limitation may be prevented is signaled to the driver.

According to yet another embodiment, a device for operating a motor vehicle may be designed such that, upon detection of a critical operating state of the motor vehicle and/or of a drive system of the motor vehicle that may lead to an operating error, the existence of the critical operating situation is signaled to a driver of the motor vehicle and may be designed such that, if the operating error occurs, there is a switchover to a limited operation of the drive system.

According to yet another embodiment, a device for operating a motor vehicle may be designed such that, if an operating error of the motor vehicle and/or of a drive system of the motor vehicle occurs, there is a switchover to a limited operation of the drive system and it is signaled to a driver of the motor vehicle that the drive system is being operated in limited operation.

BRIEF DESCRIPTION OF THE DRAWINGS

The invention is described in more detail below with reference to schematic drawings, in which;

FIG. 3 shows a first setpoint value characteristic,
FIG. 4 shows a second setpoint value characteristic.

In all of the figures, elements of an identical design or function are denoted by the same reference characters.

DETAILED DESCRIPTION

Figure 1:
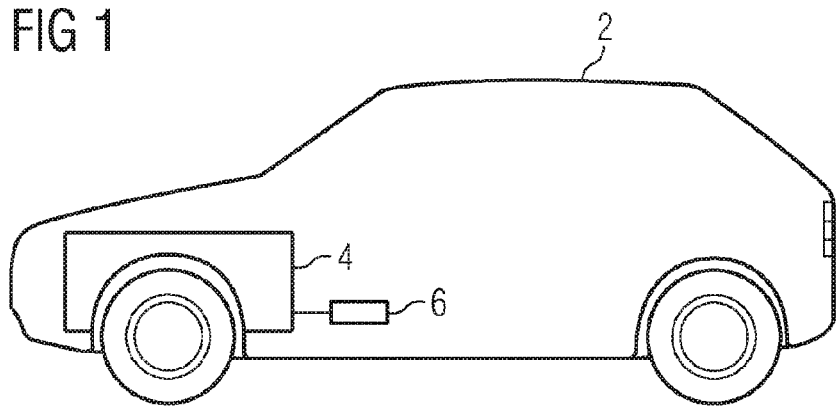
FIG. 1 shows a motor vehicle.
Figure 2:
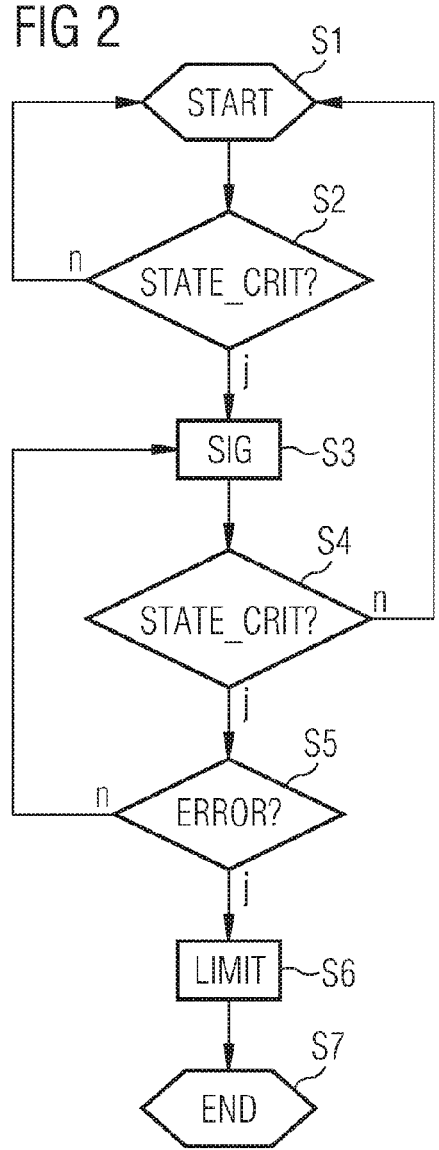
FIG. 2 shows a program for operating a drive system.

According to a first aspect, in a method and a device for operating a motor vehicle, if a critical operating state of the motor vehicle and/or of a drive system of the motor vehicle is detected, the existence of the critical operating state is signaled to a driver of the vehicle. The critical operating state may lead to an operating error. If the operating error occurs, there is a switchover to a limited operation of the drive system.

This makes it possible to prevent the driver from being surprised by an immediate restriction of availability as a result of the limiting of the operation of the drive system and hence from getting into a dangerous situation as a result of a limitation during limited operation. This may be particularly advantageous if the limitation has an effect upon a torque generated by the drive system and/or upon a rotational speed of the drive system and/or upon a velocity of the motor vehicle. This allows safe driving with the motor vehicle even if the critical operating state occurs. It moreover gives the driver the opportunity to alter his driving behavior in such a way that the critical operating state no longer exists and/or that there is no longer any need to switch over to limited operation and/or that the operating error does not occur.

According to a second aspect, in a method and a device for operating the motor vehicle, if the operating error of the motor vehicle and/or of the drive system occurs, there is a switchover to a limited operation of the drive system. Given active and/or non-active limiting of the drive system, it is signaled to a driver of the motor vehicle that the drive system is being operated in limited operation.

In a driving situation where limited operation, for example limitation of the torque, is active, it may happen that the vehicle is being operated below the limitation. The driver therefore does not notice that the i.c. engine is unable—as in this case—to make the full torque available. For example, in the absence of signaling of the active limited operation, the driver may be driving behind a slow vehicle without noticing that the full torque is not available. It is only if the i.c. engine is to be operated above the limitation, for example, during overtaking, that the driver, in the absence of signaling of the active limited operation, would then detect such operation. This may lead to a hazardous traffic situation as the driver may make a false assessment of the behavior of the drive system. Signaling of the active limited operation therefore contributes towards road safety.

According to further embodiments, signaling of the limited operation is intensified upon detection of the critical operating state up to the switchover to limited operation and/or from the switchover to limited operation up to the overshooting and/or the undershooting of the limitation. This allows the driver to drive up to the switchover to limited operation and therefore helps to prevent the driver from being surprised.

According to further embodiments, the detection of the critical operating state and/or the switchover to limited operation is signaled by a reaction of the drive system and/or by a driver information system. The reaction of the drive system allows a haptic signal effect without additional components. The driver information system may comprise for example a visual display and/or an audible output unit and/or a vibrating alarm that is coupled for example to the steering wheel. The signaling of the switchover to the limited operating state by the driver information system contributes towards the driver being surprised as little as possible, because the driver is generally accustomed to receiving different items of information via the driver information system.

According to further embodiments, the reaction of the drive system comprises a variation of a setpoint position of an actuator about a defined setpoint position of the actuator. This is a particularly simple way of signaling detection of the switchover to limited operation by means of the engine reaction.

According to further embodiments, the position of the actuator has an effect upon a torque generated by the drive system and/or upon a rotational speed of the drive system and/or upon a velocity of the motor vehicle. This contributes in a particularly effective manner towards signaling the critical operating state and/or the operating error to the driver.

According to further embodiments, given the existence of the critical operating state, the manner in which occurrence of the operating error may be prevented is signaled to the driver and/or, given the switchover to limited operation, the manner in which overshooting and/or undershooting of the limitation may be prevented is signaled to the driver.

The various embodiments of the methods may be translated to embodiments of the devices.

A motor vehicle 2 (FIG. 1) comprises a drive system 4 and preferably a driver information system 6. The drive system 4 comprises for example an internal combustion engine and/or an electric motor.

An engine management system of the drive system 4 may detect a critical operating state STATE-CRIT of the drive system 4. The critical operating state STATE-CRIT may be characterized for example by an element of the drive system 4 failing and/or demonstrating implausible behavior and/or by a measured value of the drive system 4 entering a range, in which it is probable that an operating error ERROR will occur.

If the critical operating state STATE-CRIT is triggered by the defective element of the drive system 4, then the drive system 4 may nevertheless continue to be operated normally. The occurrence of the operating error ERROR, on the other hand, makes a limited operation LIMIT of the drive system 4 necessary because otherwise serious damage to the drive system 4 and/or the motor vehicle 2 may occur. The element of the drive system 4 comprises for example a sensor and/or an actuator of the drive system 4. The actuator may be for example a throttle valve, a pulse charging valve, an injection valve, a spark plug or any other actuator of the drive system 4.

In limited operation LIMIT, as a limitation for example [for] a setpoint value TQ_REQ of a torque generated by the drive system 4 an upper torque limit value may be set and/or [for] a setpoint value V_REQ of a velocity of the motor vehicle 2 an upper velocity limit value may be set and/or [for] a setpoint value N_REQ of a rotational speed of the drive system 4 an upper rotational speed limit value may be set.

In the active limited operation LIMIT the limitation is merely set. If for example the drive system 4 in limited operation is being operated below the upper torque limit value, the limitation, whilst being set, still does not take effect, i.e. in the absence of a signal the driver does not notice the limitation. If the limitation takes effect, then the full torque for example is not available to the driver.

The switchover to limited operation LIMIT of the drive system 4 may [lead] to a sudden decrease in performance of the drive system 4 if the motor vehicle 4 and/or the drive system 4 is actually being operated in the limited range. To prevent the driver from being surprised by the decrease in performance, which may lead to a hazardous driving situation, preferably in the critical operating state STATE_CRIT prior to occurrence of the operating error ERROR it is signaled to the driver that the drive system 4 is in the critical operating state STATE_CRIT.

Alternatively or additionally the switchover to limited operation LIMIT may be signaled to the driver. This is preferably independent of whether the drive system 4 is actually being operated in the limited range. The driver is therefore informed in good time about a restriction of his facilities, for example the available torque.

To signal the critical operating state STATE_CRIT and/or limited operation LIMIT it is possible to use for example the driver information system 6. For this purpose, the driver information system 6 preferably comprises a visual output unit and/or an audible output unit. The driver information system 6 may further comprise a vibrating alarm that is coupled for example to a steering wheel of the motor vehicle 2 and/or to a driver seat of the motor vehicle 2.

Preferably, however, the critical operating state STATE_CRIT and/or limited operation LIMIT is signaled to the driver by a reaction of the drive system 4. The reaction of the drive system 4 preferably comprises a variation VAR of an actual position of an actuator of the drive system 4 about a defined actual position of the corresponding actuator. In an advantageous manner the position of the actuator has an effect upon the torque, the rotational speed and/or the velocity.

The defined actual position of the actuator is preferably defined by a requirement of the driver of the motor vehicle 2 to change his vehicle-operator command. The vehicle-operator command may comprise for example a desired torque, a desired rotational speed and/or a desired velocity of the motor vehicle 2. The variation VAR of the actual position is preferably a periodic variation of the actual position within a defined position range about the defined actual position.

A program for operating the drive system is preferably stored on a storage medium of the engine management system of the drive system 4. The program is used to inform the driver, if the critical operating state STATE_CRIT occurs, about the occurrence of the critical operating state STATE_CRIT and warn him possibly in good time before the occurrence of the operating error ERROR and the associated switchover to limited operation LIMIT. The program is preferably started in a step S1 at a time close to a start-up of the drive system 4. In step S1 possibly variables are initialized. In a step S2 it is checked whether the critical operating state STATE_CRIT exists. If the condition of step S2 is not met, processing continues afresh in step S1. If the condition of step S2 is met, processing continues in a step S3.

In step S3 a signal SIG is generated to signal the critical operating state STATE_CRIT.

In a step S4 it is checked whether the critical operating state STATE_CRIT still exists. If the condition of step S4 is not met, processing continues afresh in step S1. If the condition of step S4 is met, processing continues in a step S5.

In step S5 it is checked whether the operating error ERROR of the drive system 4 exists. If the condition of step S5 is not met, processing continues afresh in step S3. If the condition of step S5 is met, processing continues in a step S6.

In step S6 there is a switchover to limited operation LIMIT.

In a step S7 the program may be terminated. The program is however preferably executed periodically during operation of the motor vehicle 2.

The actual value TQ_SP of the torque generated by the drive system 4, the actual value V_SP of the velocity of the motor vehicle 2 and/or the actual value N_SP of the torque of the drive system 4 may be varied for example in accordance with a rectangular-pulse signal (FIG. 3). The variation VAR occurs preferably within a torque range and/or velocity range and/or rotational speed range about a torque requirement TQ_REQ and/or a velocity requirement V_REQ and/or a rotational speed requirement N_REQ. In FIG. 3 the actual values and the requirements (setpoint values) are slightly offset relative to one another to allow the lines to be distinguished from one another. Outside of the diagrammatic representation preferably the setpoint values correspond to the requirements.

Preferably after the onset of the critical operating state STATE_CRIT at least one of the actual values is modulated by the defined variation VAR until a defined period of time DUR has elapsed and/or until the critical operating state STATE_CRIT no longer exists and/or until the operating error ERROR occurs and there is a switchover to limited operation LIMIT.

Preferably, an amplitude of the variation VAR is determined in dependence upon an evaluation of the critical operating state STATE_CRIT and/or in dependence upon an evaluation of the possibly occurring operating error ERROR. Thus, a serious critical operating state STATE_CRIT and/or a serious operating error ERROR may cause a strong reaction of the drive system 4, while a relatively harmless critical operating state STATE_CRIT and/or a harmless operating error ERROR may cause only a slight reaction of the drive system 4.

Preferably, as the period of time DUR progresses and/or the onset of the operating error ERROR approaches and/or becomes more probable, the reaction of the drive system 4 is intensified (FIG. 4). Preferably, this is achieved by an increasing amplitude of the variation VAR.

The invention is not restricted to the indicated embodiments. For example, any desired setpoint value of an actuator may be varied if this leads to a reaction of the drive system 4 that is perceptible to the driver. Furthermore, the program may be used in any desired vehicle, for example in an aircraft and/or a ship and/or a lorry.

The invention claimed is:

1. A method of operating a motor vehicle, comprising the steps of:
   upon detection of a critical operating state of at least one of the motor vehicle and a drive system of the motor vehicle that may lead to an operating error:
      signaling the existence of the critical operating state to a driver of the motor vehicle, and
      if the operating error occurs, performing a switchover to a limited operation of the drive system,
      signaling the limited operation of the drive system, wherein said signaling is intensified during at least one of (a) a period from detection of the critical operating state to the switchover to limited operation and (b) a period from the switchover to limited operation to an overshooting or an undershooting of an operational limitation associated with the limited operation.

2. A method of operating a motor vehicle, comprising the steps of:
   upon occurrence of an operating error of at least one of the motor vehicle and a drive system of the motor vehicle:
      performing a switchover to a limited operation of the drive system defining at least one of an active limitation and a non-active limitation of the drive system,
      signaling to a driver of the motor vehicle that the drive system is being operated in limited operation, wherein said signaling is intensified during at least one of (a) a period from detection of the critical operating state to the switchover to limited, operation and (b) a period from the switchover to limited operation to an overshooting or an undershooting of an operational limitation associated with the limited operation.

3. A method of operating a motor vehicle, comprising:
   upon detection of a critical operating state of at least one of the motor vehicle and a drive system of the motor vehicle that may lead to an operating error:
      signaling the existence of the critical operating state to a driver of the motor vehicle, and
      if the operating error occurs, performing a switchover to a limited operation of the drive system,
      wherein at least one of the detection of the critical operating state and the switchover to limited operation is signaled by a reaction of the drive system, said reaction comprising a variation of an actual position of an actuator about a defined actual position of the actuator.

4. The method according to claim 3, wherein the position of the actuator has an effect upon at least one of a torque generated by the drive system, a rotational speed of the drive system, and upon a velocity of the motor vehicle.

5. A method of operating a motor vehicle, comprising:
   upon detection of a critical operating state of at least one of the motor vehicle and a drive system of the motor vehicle that may lead to an operating error, signaling the existence of the critical operating state to a driver of the motor vehicle, and
   upon the occurrence of the operating error, performing a switchover to a limited operation of the drive system, the limited operation defining an operational limitation of the drive system, and
   signaling to the driver a manner in which an overshooting or an undershooting of the operational limitation of the drive system may be prevented.

6. A device for operating a motor vehicle, the device being programmed to:
upon detection of a critical operating state of at least one of the motor vehicle and a drive system of the motor vehicle that may lead to an operating error:
signal the existence of the critical operating state to a driver of the motor vehicle, and
if the operating error occurs, perform a switchover to a limited operation of the drive system,
signal the limited operation of the drive system, wherein said signaling is intensified during at least one of (a) a period from detection of the critical operating state to the switchover to limited operation and (b) a period from the switchover to limited operation to an overshooting or an undershooting of an operational limitation associated with the limited operation.

7. A device for operating a motor vehicle, the device being programmed to:
upon occurrence of an operating error of at least one of the motor vehicle and a drive system of the motor vehicle:
perform a switchover to a limited operation of the drive system, and
signal to a driver of the motor vehicle that the drive system is being operated in limited operation, wherein said signaling is intensified during at least one of (a) a period from detection of the critical operating state to the switchover to limited operation and (b) a period from the switchover to limited operation to an overshooting or an undershooting of an operational limitation associated with the limited operation.

8. A device for operating a motor vehicle, the device being programmed to:
upon detection of a critical operating state of at least one of the motor vehicle and a drive system of the motor vehicle that may lead to an operating error:
signal the existence of the critical operating state to a driver of the motor vehicle, and
if the operating error occurs, perform a switchover to a limited operation of the drive system,
wherein at least one of the detection of the critical operating state and the switchover to limited operation is signaled by a reaction of the drive system, said reaction comprising a variation of an actual position of an actuator about a defined actual position of the actuator.

9. A device for operating a motor vehicle, the device being programmed to:
upon occurrence of an operating error of at least one of the motor vehicle and a drive system of the motor vehicle:
perform a switchover to a limited operation of the drive system, and
signal to a driver of the motor vehicle that the drive system is being operated in limited operation, wherein at least one of the detection of the critical operating state and the switchover to limited operation is signaled by a reaction of the drive system, said reaction comprising a variation of an actual position of an actuator about a defined actual position of the actuator.

10. A method of operating a motor vehicle, comprising:
upon occurrence of an operating error of at least one of the motor vehicle and a drive system of the motor vehicle:
performing a switchover to a limited operation of the drive system defining at least one of an active limitation and a non-active limitation of the drive system, and
signaling to a driver of the motor vehicle that the drive system is being operated in limited operation,
wherein the switchover to limited operation is signaled by a reaction of the drive system, said reaction comprising a variation of an actual position of an actuator about a defined actual position of the actuator.

11. The method according to claim 10, wherein the position of the actuator has an effect upon at least one of a torque generated by the drive system, a rotational speed of the drive system, and upon a velocity of the motor vehicle.

12. A method of operating a motor vehicle, comprising:
upon occurrence of an operating error of at least one of the motor vehicle and a drive system of the motor vehicle:
performing a switchover to a limited operation of the drive system defining at least one of an active limitation and a non-active limitation of the drive system,
signaling to a driver of the motor vehicle that the drive system is being operated in limited operation, and
signaling to the driver a manner in which an overshooting or an undershooting of the operational limitation of the drive system may be prevented.

* * * * *